United States Patent Office 3,804,863
Patented Apr. 16, 1974

3,804,863
PROCESS FOR THE MANUFACTURE OF 1-BROMO-
4-ACYLAMINOANTHRAQUINONES
Eduard Moergeli, Muttenz, and Rudolf Winkler, Reinach,
Basel-Land, Switzerland, assignors to Ciba-Geigy AG,
Basel, Switzerland
No Drawing. Continuation of abandoned application Ser.
No. 727,052, May 6, 1968. This application June 7,
1971, Ser. No. 150,943
Claims priority, application Switzerland, May 9, 1967,
6,553/67; July 7, 1967, 9,704/67
Int. Cl. C09b 1/36, 1/42
U.S. Cl. 260—377
9 Claims

ABSTRACT OF THE DISCLOSURE

A process for the manufacture of 1-bromo - 4 - acyl-aminoanthraquinones wherein a 1 - acylaminoanthraquinone is brominated in the presence of water.

---

This application is a continuation of S.N. 727,052, filed May 6, 1968, now abandoned.

German patent specification No. 518,406 and BIOS Final Report 1484, page 13, describe the halogenation of 1-benzoylaminoanthraquinone in inert organic solvents, especially nitrobenzene. There is agreement in the yield of 1-chloro-4-benzoylaminoanthraquinone being given as about 65%. The effective yield is admittedly somewhat higher but the working-up of the residual quantities remaining in the mother liquors is not worthwhile because of the separation of monohalogen and dihalogen compounds which then becomes necessary. The bromination of 1-benzoylaminoanthraquinone in organic solvents according to the process described in Example 6 of the above-mentioned patent specification takes place even less satisfactorily than the chlorination. The extraordinary low speed of reaction of the bromination is a great disadvantage in an industrial process. Even under favorable conditions a yield of barely 50% is obtained and despite a large excess of bromine the resulting product is still contaminated with relatively large quantities of starting material.

The patent specification quoted also mentions that on halogenation of 1-acetylaminoanthraquinone dihalogen derivatives are almost exclusively obtained.

This invention is based on the surprising observation that 1-bromo-4-acylaminoanthraquinones may be obtained in almost quantitative yield and outstanding purity when the bromination of the 1-acylaminoanthraquinone is carried out in the presence of water.

Suitable starting substances are for example 1-acylaminoanthraquinones, especially, 1 - benzoylaminothraquinone, which may for example be substituted by halogen atoms, or alkyl, alkoxy or nitro groups in the benzoyl residue or in the benzene residue of the anthraquinone nucleus which is free from benzoylamino groups, and also 1-alkanoylaminoanthraquinones which may for example be substituted by halogen atoms or alkoxy, phenoxy, or phenyl residues in the alkyl residue, as well as 1-acyl-aminoanthraquinones in which the acyl residues are derived from carbonic acid half-esters, heterocyclic carboxylic acids or organic sulphonic acids, especially arylsulphonic acids. The following may be mentioned as examples:

1-acetylaminoanthraquinone,
1-chloroacetylaminoanthraquinone,
1-ethoxycarbonylaminoanthraquinone,
1,5-diacetylaminoanthraquinone,
1,5-dichloroacetylaminoanthraquinone,
1,5-diethoxycarbonylaminoanthraquinone,
1-benzoylaminoanthraquinone,
1-o-chlorobenzoylaminoanthraquinone,
1-p-chlorobenzoylaminoanthraquinone,
1-o-fluorobenzoylaminoanthraquinone,
1-p-methylbenzoylaminoanthraquinone,
1-p-methoxybenzoylaminoanthraquinone,
1-m-nitrobenzoylaminoanthraquinone,
1-p-toluenesulphonylaminoanthraquinone,
1-chloro-5-benzoylaminoanthraquinone,
1-chloro-5-o-fluorobenzoylaminoanthraquinone,
1-chloro-8-benzoylaminoanthraquinone,
1-nitro-5-acetylaminoanthraquinone, and
2-chloro-5-benzoylaminoanthraquinone.

The amount of the water present in the reaction may vary within wide limits; thus for example the reaction can be carried out in a completely aqueous medium, the amount of the water being selected so that a dispersion which can still be stirred is obtained. Thus it is advantageous to use at least 1 part, preferably at least 1.5 parts, of water for each part of the acylaminoanthraquinone. Significantly larger quantities of water may also be used without disadvantage, but the economy of the process is then impaired by the requisite larger vessels. The reaction can also be carried out in the presence of an acid, for example sulphuric acid or acetic acid, the acid concentration being advantageously not more than 50%, and/or in the presence of an inert organic solvent, in which case the proportion of the organic solvent can be substantially larger than that of the water.

Suitable inert organic solvents are for example chlorinated hydrocarbons for example tetrachloroethane, chlorobenzene, o-dichlorobenzene or especially nitrobenzene. The use of organic solvents has the advantage that the brominated acylaminoanthraquinones can be obtained in a single process stage, starting from aminoanthraquinone. The aminoanthraquinone is advantageously first acylated in the organic solvent, water is then added to the reaction mixture without isolating the acylaminoanthraquinone which is then brominated.

It is advantageous to use a large excess of bromine, preferably at least 75% above the theoretical amount. When however the bromination is carried out in the presence of an oxidizing agent, for example an alkali metal chlorate, alkali metal persulphate or especialy an alkali metal bromate, an excess of bromine is unnecessary and it even suffices to use significantly less bromine than 1 mole of $Br_2$ for each bromine atom to be introduced, since the hydrogen bromide produce in the reaction is immediately re-oxidized to bromine.

Since the function of the water during the bromination is to bind the resulting hydrogen bromide, only a small quantity of water is needed when using an oxidizing agent and an organic solvent, advantageously not less than 3 mols of water for each mol of $Br_2$.

The most advantageous reaction temperatures are between 15 and 100° C. Within these limits the bromination takes place remarkably rapidly and without side-reactions.

The brominated 1-acylaminoanthraquinones are as a rule produced in a homogeneous crystalline form and can easily be isolated from the reaction mixture by filtration. They are distinguished by high purity and can therefore be used without purification for subsequent reactions.

In the examples which follow the parts, unless otherwise stated, denote parts by weight and the percentages denote percentages by weight.

EXAMPLE 1

48 parts of bromine are added dropwise in 30 minutes to a mixture of 7.55 parts of sodium bromate, 32.7 parts of 1-benzoylaminoanthraquinone and 65.4 parts of water at 40 to 45° C. while stirring. The reaction mixture is stirred for a further 10 hours at the same temperature and is then poured into about 1 liter of water in which 40 parts of sodium bisulphite have been dissolved, in order to remove the excess bromine. After thorough stirring the brominated product is filtered, washed until neutral and dried; 39.9 parts, corresponding to 98.3% of theory, of practically pure 1-bromo-4-benzoylaminoanthraquinone are obtained as a yellow crystalline powder of melting point 223 to 226° C., corrected. Found, Br 19.90%; calculated, Br 19.67%.

The 1-benzoylaminoanthraquinone used in the example was manufactured by benzoylation of 1-aminoanthraquinone with benzoyl chloride in o-dichlorobenzene.

When the bromination is carried out in nitrobenzene in accordance with Example 6 of German patent specification No. 518,406 at 40 to 45° C. and using 4.8 times the theoretically required amount of bromine, a 1-bromo-4-benzoylaminoanthraquinone is obtained in 49% yield after 46 hours bromination which melts between 217 and 223° C. The product is still heavily contaminated with starting material and the bromine content is only 16.94%. More highly brominated compounds can be detected in the mother liquor.

EXAMPLE 2

48 parts of bromine are added dropwise at room temperature in about 30 minutes to a mixture of 7.55 parts of sodium bromate, 65.4 parts of water and 32.7 parts of 1-benzoylaminoanthraquinone. The temperature is raised to 50–55° C. and the mixture stirred for 6 hours. Working-up takes place as in Example 1; 40.1 parts, corresponding to 98.8% of theory, of 1-bromo-4-benzoylaminoanthraquinone melting at 225 to 227° C. corrected, and having a bromine content of 19.45% are obtained. Only small quantities of starting material can be chromatographically detected in the product as impurities.

EXAMPLE 3

48 parts of bromine are added dropwise in 30 minutes to a mixture of 12.2 parts of potassium chlorate, 65.4 parts of water and 32.7 parts of 1-benzoylaminoanthraquinone at 40 to 45° C. while stirring. After 1 hour the thick sludge is diluted with 20 parts of water and then stirred for a further 10 hours at 45° C. The brominated product is worked-up as described in Example 1; 40.1 parts, corresponding to 98.8% of theory, of 1-bromo-4-benzoylaminoanthraquinone melting at 225 to 228° C. corrected, and having a bromine content of 19.94% are obtained. The product does not contain any chlorine.

EXAMPLE 4

40 parts of bromine are added dropwise to a mixture of 13.5 parts of potassium persulphate, 65.4 parts of water and 32.7 parts of 1-benzoylaminoanthraquinone in 30 minutes while stirring. The temperature is raised and the mixture is stirred for 6 hours at 50 to 55° C. After working-up 40.1 parts of 1-bromo-4-benzoylaminoanthraquinone corresponding to 98.8% of theory are obtained; melting point 225 to 227° C., corrected, bromine content 19.63%.

EXAMPLE 5

64 parts of bromine are slowly added dropwise to a mixture of 32.7 parts of 1-benzoylaminoanthraquinone and 65.4 parts of water while stirring. The reaction mixture is stirred for 20 hours at 50 to 55° C. and is then poured into a solution of 1,100 parts of water and 40 parts of sodium bisulphite. After thorough stirring until the excess bromine has disappeared the mixture is worked-up; 39.6 parts of 1-bromo-4-benzoylamino-anthraquinone are obtained corresponding to 97.5% of theory. Melting point 225 to 228° C. corrected. Bromine content 19.64%. The treatment with sodium bisulphite can be dispensed with if the excess bromine is recovered after the bromination by distilling it off at about 85° C., the same end result being achieved.

EXAMPLE 6

32.7 parts of 1-benzoylaminoanthraquinone are dissolved in 98 parts of concentrated sulphuric acid and then precipitated from the solution by dropwise addition of 200 parts of water at 45° C. while stirring and cooling; 48 parts of bromine are added dropwise to the suspension in 2 hours and the mixture is then stirred for 6 hours at 40 to 45° C. and 6 hours at 60 to 65° C.

After working-up with sodium bisulphite 38.5 parts of 1-bromo-4-benzoylaminoanthraquinone melting at 224 to 228° C. corrected, and having a bromine content of 19.5% are obtained.

EXAMPLE 7

A solution of 7.55 parts of sodium bromate in 32.7 parts of water is added dropwise in 3 hours to a mixture of 32.7 parts of 1-benzoylaminoanthraquinone, 65.4 parts of water and 32 parts of bromine at 50 to 55° C. The mixture is stirred for 3 hours at the same temperature and the brominated product is worked-up. The 1-bromo-4-benzoylaminoanthraquinone is obtained in a yield of 97.4% of theory. Melting point 224 to 228° C. corrected. Bromine content 19.70%.

No higher brominated compounds can be chromatographically separated from the brominated product.

When the bromination is carried out with only 28 parts of bromine a brominated product having a bromine content of 14.07% and a melting point of 213 to 217° C. corrected is produced in 92.2% yield.

EXAMPLE 8

48 parts of bromine are added dropwise in 30 minutes to a mixture of 32.7 parts of 1-benzoylaminoanthraquinone, 98.1 parts of water and 7.55 parts of sodium bromate. The reaction mixture is stirred for 3 hours at 50 to 55° C. and worked-up as usual.

Yield 39.6 parts = 97.6% of theory of 1-bromo-4-benzoylaminoanthraquinone. Melting point 225 to 228° C. corrected. Bromine content 19.7%.

EXAMPLE 9

64 parts of bromine are added dropwise in 30 minutes to a mixture of 32.7 parts of 1-benzoylaminoanthraquinone, 65.4 parts of water and 7.55 parts of sodium bromate whilst stirring and the mixture is stirred for a further 2½ hours without applying heat. 39.6 parts, corresponding to 97.5% of theory, of 1-bromo-4-benzoylaminoanthraquinone are obtained. Melting point 224 to 227° C., corrected. Bromine content 19.52%.

EXAMPLE 10

48 parts of bromine are slowly added dropwise to a mixture of 26.5 parts of 1-acetylaminoanthraquinone, 100 parts of water and 7.55 parts of sodium bromate whilst stirring and allowing the temperature to rise to 30° C. The mixture is stirred for a further 21 hours at 20 to 25° C. and is then worked-up as stated in Example 1; 33.3 parts, corresponding to 96.8% of theory, of practically pure 1-acetylamino-4-bromanthraquinone are obtained. Melting point 222 to 224° C. correceted. Bromine: found, 23.45%; calculated, 23.22%.

The 1-acetylamino-4-bromanthraquinone obtained can be converted into 1-amino-4-bromanthraquinone or 1-amino-4-hydroxyanthraquinone by heating with sulphuric acid.

EXAMPLE 11

36 parts of bromine are slowly added dropwise to a mixture of 28.45 parts of 1-chloro-5-(o-fluorobenzoyl-amino)-anthraquinone, 65 parts of water and 5.67 parts of sodium bromate whilst stirring. The reaction mixture is stirred for a further 6 hours at 50 to 55° C. and then worked-up; 35.5 parts, corresponding to a yield of 97.5% of theory, of 1 - chloro - 8 - bromo-5-(o-fluorobenzoyl-amino)-anthraquinone are obtained. Melting point 255 to 257° C. corrected. Bromine: found, 16.7%; chlorine: found, 7.68%.

When the 1 - chloro - 5 - (o-fluorobenzoylamino)-anthraquinone is replaced by an equimolecular amount of 1-(o-fluorobenzoylamino)-anthraquinone (melting point 272° C., corrected), 31.4 parts of 4-bromo-1-(o-fluorobenzoylamino)-anthraquinone melting at 198 to 199° C. corrected, are obtained. Bromine: found, 19.09%; calculated, 18.84%.

EXAMPLE 12

44.8 parts of bromine are added dropwise in 30 minutes to a mixture of 25.9 parts of 1-(p-toluenesulphamino)-anthraquinone (melting point 227° C., corrected) and 65 parts of water whilst stirring. The mixture is stirred for a further 19 hours at room temperature and the reaction product worked-up as usual; 31 parts, corresponding to 97.2% of theory, of practically pure 1-(p-toluenesulphamino)-4-bromanthraquinone melting at 165 to 168° C. corrected are obtained. Bromine: found, 17.48%; bromine: calculated, 17.51%.

The recrystallized 1 - (p-toluenesulphamino)-4-bromanthraquinone canbe quantitatively hydrolyzed to 1-amino-4-bromanthraquinone of melting point 179 to 180° C. corrected by means of concentrated sulphuric acid at room temperature.

EXAMPLE 13

A mixture of 153 parts of 1-aminoanthraquinone, 540 parts of nitrobenzene and 103 parts of benzoyl chloride is stirred for 2 hours at 150 to 155° C. and for 1 hour at 185 to 190° C. The reaction mixture is cooled to room temperature, 5 parts of iodine, 266 parts of bromine and 200 parts of water are added, and the batch stirred for 2 hours at 50 to 55° C. 350 parts of sodium hypochlorite solution (active chlorine content 14%) are then added dropwise and the mixture is stirred for a further 18 hours at 50 to 55° C. The reaction product is filtered at 15° C., washed with methyl alcohol to remove nitrobenzene, and dried.

221.7 parts, corresponding to 82% of theory, of pure 1-benzoylamino-4-bromoanthraquinone of melting point 230 to 231° C. corrected are obtained. Bromine: calculated, 19.67%; bromine, found 19.47%.

The product can be converted to 1-amino-4-hydroxyanthraquinone by heating in 5 % oleum.

EXAMPLE 14

13.3 parts of bromine followed by a solution of 1.68 parts of sodium bromate in 20 parts of water are added dropwise whilst stirring to a mixture of 21.7 parts of 1-benzoylaminoanthraquinone, 54 parts of nitrobenzene and 0.5 part of iodine. The mixture is thoroughly stirred for 16 hours at 60 to 65° C., cooled to 15° C., and the reaction product is filtered. After washing with alcohol and drying, 25.3 parts of 1-benzoylamino-4-bromoanthraquinone of melting point 230 to 231° C. corrected are obtained, corresponding to 93.3% of theory. The bromine content is 19.01%.

The same results are obtained when the theoretical amount of bromine (10.7 parts) is used.

EXAMPLE 15

A mixture of 17.2 parts of 1-aminoanthraquinone, 90 parts of nitrobenzene and 14.5 parts of p-chlorobenzoyl chloride is stirred for 2 hours at 150 to 155° C. and 1 hour at 180 to 190° C. The reaction mixture is cooled to room temperature, 0.5 part of iodine, 30 parts of bromine and 20 parts of water are added, and the batch stirred for 2 hours at 50 to 55° C. 40 parts of sodium hypochlorite solution, corresponding to an active chlorine content of 14%, are then added and the mixture stirred for a further 15 hours at 55° C. After working-up as described in Example 13, 28.7 parts of 1-(p-chlorobenzoylamino)-4-bromoanthraquinone of melting point 238 to 239° C. corrected are obtained corresponding to 86.7% of theory.

EXAMPLE 16

When in Example 10 the 1-acetylaminoanthraquinone is replaced by an equimolecular amount of 1-chloroacetylamino-anthraquinone (melting point 221° C., corrected) and the bromination is carried out in 65 parts of water in 24 hours at 50 to 55° C., 37.4 parts of 1-chloroacetylamino-4-bromanthraquinone are obtained corresponding to a yield of 98.9% of theory. Melting point 219 to 220° C. corrected. Found: bromine, 21.13%; chlorine, 9.40%. Calculated: bromine, 21.11%; chlorine, 9.63%.

EXAMPLE 17

24 parts of bromine are added dropwise in 30 minutes to a mixture of 15.5 parts of 1-acetylamino-5-nitroanthraquinone (melting point 277° C., corrected), 60 parts of water and 3.75 parts of sodium bromate whilst stirring. The mixture is stirred for 20 hours at 50 to 55° C. and after working-up with sodium bisulphite solution, 18.4 parts of 1-acetylamino-4-bromo-5-nitroanthraquinone are obtained corresponding to a yield of 94.7% of theory. Melting point 262 to 263° C., corrected. Bromine: found, 20.31%; bromine: calculated, 20.53%.

EXAMPLE 18

28.8 parts of bromine are gradually added whilst stirring to a mixture of 21.7 parts of 1-benzoylamino-5-chloroanthraquinone, 65 parts of water and 4.5 parts of sodium bromate, and the mixture then stirred for 23 hours at 50 to 55° C. After treatment with sodium bisulphite solution 26.1 parts, of 1-benzoylamino-4-bromo-5-chloroanthraquinone are obtained corresponding to 98.5% of theory. Melting point 216 to 219° C., corrected. Found: bromine, 18.29%; chlorine, 8.06%. Calculated: bromine, 18.13%; chlorine, 8.04%.

When the 1 - benzoylamino - 5 - chloroanthraquinone is replaced by an equimolecular quantity of 1-benzoylamino-6-chloroanthraquinone and bromination carried out in 106 parts of water, 1-benzoylamino-4-bromo-6-chloroanthraquinone of melting point 218 to 220° C. corrected, is obtained in a yield of 98% of theory.

When in paragraph 1 the 1-benzoylamino-5-chloroanthraquinone is replaced by 1 - benzoylamino - 8 - chloroanthraquinone 1 - benzoylamino - 4 - bromo-8-chloroanthraquinone of melting point 217° C. corrected is again obtained in excellent quality and yield.

EXAMPLE 19

24 parts of bromine are gradually added dropwise to a mixture of 17 parts of 1 - p - methyl-benzoylaminoanthraquinone, 60 parts of water and 3.75 parts of sodium bromate whilst stirring. The reaction mixture is stirred for 20 hours at 50 to 55° C., worked-up as usual and 22.3 parts of 1 - p - methyl - benzoylamino - 4 - bromoanthraquinone brominated in the tolyl residue are obtained; melting point 226 to 227° C. corrected. Bromine, found 31.8%; calculated 32.01%.

The bromination of 1-(p-anisoylamino)-anthraquinone proceeds in a similar manner.

EXAMPLE 20

38.4 parts of bromine are added dropwise in 30 minutes to a mixture of 23.6 parts of 1-ethoxycarbonylamino-anthraquinone, 65 parts of water and 6 parts of sodium bromate whilst stirring. The reaction mixture is stirred for 21 hours at 50 to 55° C., then poured into a hot solution of 1,000 parts of water and 40 parts of sodium bisulphite, stirred, and the product filtered. The lumpy substance is finely ground and again treated with sodium bisulphite solution in the same way. After filtering, washing and drying 28.6 parts of practically pure 1-ethoxycarbonylamino - 4 - bromoanthraquinone of melting point 233 to 234° C. corrected are obtained, corresponding to 95.6% of theory. Bromine calculated, 21.35%; found, 21.45%.

The 1 - ethoxycarbonylamino - 4 - bromanthraquinone can be saponified by heating for 4 hours at 70 at 75° C.

in 95% sulphuric acid to give 1-amino-4-bromoanthraquinone of melting point 180 to 181° C. corrected.

EXAMPLE 21

96 parts of bromine are slowly added dropwise to a mixture of 32.2 parts of 1,5-di-(acetylamino)-anthraquinone (melting point 319° C. corrected), 110 parts of water and 15.1 parts of sodium bromate whilst stirring. The mixture is stirred for 22 hours at 50 to 55° C., worked-up as described in Example 20 with solutions of 2,000 parts of water and 80 parts of sodium bisulphite at a time; 45.2 parts of 1,5-dibromo-4.8-di-(acetylamino)-anthraquinone melting at 330° C., with decomposition, are obtained. Bromine: found 33.41%; calculated, 33.29%.

EXAMPLE 22

32 parts of bromine are added dropwise in 30 minutes to a mixture of 12.7 parts of 1,5-di-(ethoxycarbonylamino)-anthraquinone (melting point 309° C., corrected), 60 parts of water and 5 parts of sodium bromate whilst stirring. The reaction mixture is stirred for 21 hours at 50 to 55° C., poured into a solution of 1,000 parts of water and 40 parts of sodium bisulphite, and stirred for 1 hour at 90° C. After filtering, washing and drying, 17.1 parts of 1,5 - di - (ethoxycarbonylamino) - 4,8 - dibromoanthraquinone are obtained. Melting ponit 322° C., with decomposition, corrected. Bromine: found, 29.69%; calculated, 29.59%.

16 parts of bromine followed by a solution of 2.5 parts of sodium bromate in 20 parts of water are added dropwise to a mixture of 12.4 parts of 1-(m-nitrobenzoylamino) - anthraquinone (melting point 199° C. corrected), 48 parts of nitrobenzene and 0.5 part of iodine whilst stirring. After 20 hours intensive stirring at 60 to 65° C. the reaction product which has crystallized in yellow uniform small needles is filtered at 10 to 15° C., washed with alcohol and dried. 13.8 parts of 1-(m-nitrobenzoylamino) - 4 - bromoanthraquinone, melting point 280 to 281° C. corrected are obtained, corresponding to a yield of 91.8% of theory. Bromine: found, 17.04%; bromine: calculated, 17.71%.

What is claimed is:

1. A process for the manufacture of 1-bromo-4-acylaminoanthraquinones wherein a 1 - acylaminoanthraquinone having a hydrogen atom in para-position to the acylamino group is brominated by the action of bromine in the presence of water at a temperature between 15° C. and 100° C., the bromination mixture containing about 1.5 to 6 parts of water for each part of 1-acylaminoanthraquinone present.

2. A process as claimed in claim 1 wherein a 1-benzoylaminoanthraquinone is used as starting material.

3. A process as claimed in claim 1 wherein a 1-alkanoylaminoanthraquinone is used as starting material.

4. A process as claimed in claim 1 wherein the bromination is effected in the presence of an oxidizing agent selected from alkali metal chlorate, alkali metal persulfate, alkali metal bromate, and sodium hypochlorite.

5. A process as claimed in claim 4 wherein an alkali metal bromate is used as oxidizing agent.

6. A process as claimed in claim 5 wherein 3 mols of bromine are used for each mol of the alkali metal bromate.

7. A process as claimed in claim 1 wherein the bromination is effected in the presence of 0.5 part by weight of sulfuric acid for each part by weight of water.

8. In a method for brominating 1-acylaminoanthraquinones to obtain the 4-bromo-1-acylaminoanthraquinone, said bromination being effected by bromine in an inert organic solvent. the yield of said 4 - bromo - 1-acylaminoanthraquinone being about 50%, the improvement therein which comprises brominating said 1-acylaminoanthraquinones by the action of bromine in the presence of water at a temperature between 15° C. and 100° C., there being at least 3 moles of water for each mole of $Br_2$, said improved process being characterized by a substantial increase in the conversion of the 1-acylaminoanthraquinone to the 4-bromo-1-acylaminoanthraquinone.

9. A process as claimed in claim 8 wherein the bromination is effected in the presence of nitrobenzene as an inert solvent.

References Cited

LVBS, Synthetic Dyes and Pigments, pp. 346 and 347 (1955).

LORRAINE A. WEINBERGER, Primary Examiner

E. J. SKELLY, Assistant Examiner

U.S. Cl. X.R.

260—371